(12) United States Patent
Groot

(10) Patent No.: US 6,257,808 B1
(45) Date of Patent: Jul. 10, 2001

(54) WALL FISHING APPARATUS

(76) Inventor: Daniel Groot, c/o K. Stephan 7360 46th Ave. North, St. Petersburg, FL (US) 33709

( * ) Notice: Subject to any disclaimer, the term of this patent is extended or adjusted under 35 U.S.C. 154(b) by 0 days.

(21) Appl. No.: 09/521,350

(22) Filed: Mar. 9, 2000

Related U.S. Application Data

(60) Provisional application No. 60/162,250, filed on Oct. 29, 1999.

(51) Int. Cl.[7] .................................................. B23B 41/00
(52) U.S. Cl. ............................ 408/1 R; 254/134.3 FT; 408/97; 408/127; 408/227; 408/241 R
(58) Field of Search ................................ 254/134.3 FT; 408/72 B, 97, 127, 201, 276, 230, 241 R, 1 R

(56) References Cited

U.S. PATENT DOCUMENTS

| | | | |
|---|---|---|---|
| 597,750 | * | 1/1898 | Smith ................................... 408/230 |
| 839,461 | * | 12/1906 | Eastman ............................... 408/226 |
| 1,289,957 | * | 12/1918 | Tambacopolo ....................... 470/199 |
| 1,408,802 | | 3/1922 | Crocker et al. . |
| 1,712,876 | * | 5/1929 | Dolezal ................................. 408/208 |
| 2,958,349 | | 11/1960 | McNutt . |
| 3,611,549 | | 10/1971 | Pope . |
| 3,697,188 | | 10/1972 | Pope . |
| 5,149,231 | * | 9/1992 | Bowling ............................... 408/201 |
| 5,310,294 | * | 5/1994 | Perkins ................................. 408/226 |
| 5,395,188 | | 3/1995 | Bailey et al. . |
| 5,529,443 | * | 6/1996 | Flener ................................... 408/226 |
| 5,888,035 | * | 3/1999 | Cutler ................................... 408/226 |

* cited by examiner

*Primary Examiner*—Daniel W. Howell
(74) *Attorney, Agent, or Firm*—David Kiewit

(57) ABSTRACT

The invention provides a flexible guide tube with prongs or other work-engaging means at one end. These prongs may be stabbed into an obstruction in a hollow wall to set the position of a throughhole and to hold the tubular guide in a fixed position against the torsional, or other, forces of a drill or other cutting tool used to cut the hole. The drill may be rotated by means of a flexible shaft running within the guide tube. After a throughhole is cut in the obstruction, a line-fishing member may be inserted through the guide tube and the obstruction and into a space on the distal side of the obstruction. The line-fishing apparatus may comprise an end portion having a collapsed state in which it can pass through the guide tube and an expanded state in which it provides a visible target that can be readily engaged by tools operated by a worker on the distal side of the obstruction who is prohibited from getting any closer than a few yards from the target.

12 Claims, 3 Drawing Sheets

WALL FISHING APPARATUS

CROSS REFERENCE TO RELATED APPLICATIONS

This application claims the priority of U.S. Provisional Application for patent application Ser. No. 60/162,250, filed Oct. 29, 1999

STATEMENT REGARDING FEDERALLY SPONSORED RESEARCH OR DEVELOPMENT

Not Applicable

BACKGROUND OF THE INVENTION

1. Field of the Invention

The invention relates to apparatus for and methods of drilling holes through generally inaccessible structural members concealed within hollow walls and pulling flexible lines through those holes.

2. Background Information

Flexible lines, such as electrical power wires or cables, telephone wires, coaxial video entertainment cables, fiber optic signal transmission lines, water lines (e.g., for a refrigerator's ice maker), etc., can be relatively easily positioned within the walls of a building or above a ceiling of the building if those lines are installed after framing, but before the walls or ceilings are completed. This approach is customary for new construction. Once the structure has been completed, however, adding, replacing, or moving lines within a hollow wall, in a restricted crawl space above a ceiling or beneath a floor is a much more difficult task.

In many remodeling or "old work" situations in single story residences a new line of some sort or another (e.g., a three conductor non-metallic sheathed electrical power cable) is run through an attic crawl space and down through a hollow wall to a service point (such as a point where an electrical outlet box is to be installed a foot or so above a floor, or a switch box located several feet above the floor). Ideally, to avoid damaging and replacing large portions of the wall surface, a job of this sort requires cutting or drilling a hole through the top plate of the wall, shoving the line through that hole and feeding it to a small access hole cut into the hollow wall. The necessary hole can be drilled from the attic and the line shoved down through the top plate only if there is adequate working clearance—e.g., if the vertical distance between the top plate and closest roof truss, roofing panel or other obstacle above it is great enough that a workman can put an electric hand drill into position to drill through the top plate. If the service point is located on an exterior wall, this approach commonly fails completely because the vertical free space between the top plate and the lowest overhead roof member is too small. Moreover, even when there is working clearance, there is always a chance for the worker to drill the hole through the top plate between two adjacent wall studs and then find that access hole had been cut between two other walls studs. This commonly requires a second trip into the attic crawl space to drill another hole.

It is known in the prior art to use a drill having a flexible shaft to drill the hole from below, then securing access to the hole from above and feeding the line through the hole. Again, working on an exterior wall can pose an insurmountable problem if there is so little clearance between the upper surface of the top plate and an overhead roof member that a worker can not reach the hole in order to feed the line through it. It is thus desirable to have a means whereby a worker can insert a tool through a small access hole in a hollow wall, drill a hole in a top plate of that wall, and fish a line through the drilled hole even if there is very little vertical clearance between the top plate and a roof member disposed above it. It will be understood to those skilled in the art that similar situations occur when cutting through a sill into a lower floor or a crawl space beneath a house.

A number of US patents are notable among prior art references in this area. These include:

U.S. Pat. No. 1,408,802, wherein Crocker et al. teach a flexible drill shaft turning within a flexible coaxial guide tube for use in drilling holes through a plurality of ceiling joists. Crocker et al. provide a collapsible and expandable guide device mounted behind the drill head. Their guide device is adapted to collapse when pushed through a hole in a joist, and to expand under the influence of bias springs when free of the joists. When in its expanded configuration, the guide device acts to space the drill bit away from the upper surface of a ceiling by some preset amount, thus ensuring that each of a plurality of holes is made at the same distance above the ceiling.

U.S. Pat. No. 2,958,349, wherein McNutt teaches the use of a drill bit rotated by a flexible shaft encased in a rigid guide tube. The drill bit is translated toward the work through a bushing affixed adjacent one end of the guide tube.

U.S. Pat. Nos. 3,611,549 and 3,697,188, wherein Pope discloses a flexible-shafted drilling apparatus for forming holes in and installing lines through structural members concealed within hollow walls. Pope teaches the use of a drill bit having a throughhole transverse to the axis. A line or a line leader of some sort can be fed through the throughhole to attach the line to the drill bit, which is then pulled back towards the drill operator by means of the flexible shaft. Pope also teaches the use of a separate tool for guiding his drill bit into cutting contact with the concealed structural member.

U.S. Pat. No. 5,395,188, wherein Bailey et al. teach the use of a curved, rigid guide for positioning a drill bit attached to flexible shaft so as to drill an upwardly angled hole from a starting point near a floor to a finishing point within a hollow wall. Bailey et al. teach the use of their drill guide to drill through the wall and the wall sill or sole plate.

BRIEF SUMMARY OF THE INVENTION

A preferred embodiment of the invention comprises a flexible guide tube having a work-engaging means adjacent a first end of the tube; a drill or other cutting tool adapted to be inserted into the second end of the tube and pushed through the tube into cutting engagement with an obstruction engaged by the engaging means; and a means for passing a line through both a throughhole cut by the cutting tool and the guide tube after the cutting tool has been withdrawn from the tube. in this embodiment the work-engaging element is adapted to hold the tubular guide in a fixed position against the torsional, or other, forces of a drill or other cutting tool being rotated by means of a flexible shaft disposed within the guide tube so as to cut the throughhole in the obstruction.

Another feature of a preferred embodiment of the invention is the combination of a flexible guide tube; a cutting tool driven by a flexible shaft to cut a throughhole through an obstruction, the cutting tool easily inserted into and removed from the guide tube; and a line-fishing apparatus easily inserted into and removed from the guide tube. It is a specific feature of some such embodiments that the line-fishing apparatus may comprise an end portion having a collapsed state in which it can pass through the guide tube and a throughhole in a top plate. This end portion may also have an expanded state in which it provides a visible target that can be readily engaged by tools operated by a worker in the space above the top plate who is prohibited from getting any closer than a few yards from the target.

It is an objective of some embodiments of the invention to provide a method of pulling a line through a throughhole in a portion of a structural member that is inaccessible to a worker on either side of the throughhole. It is a specific objective of these embodiments to provide a method of pulling a line through a throughhole in a top plate or a sole plate of a hollow wall having a nearest access hole more than an arm's length from the throughhole and having restricted worker access on a distal side of the top plate or sole plate. This includes cases in which the throughhole extends through the top plate at a location at which the vertical clearance from the top of the top plate to a roofing member is so small as to prohibit a worker from reaching the throughhole with his or her hand. This also includes cases in which the bottom, or distal, side of the sole plate is not accessible to a worker's hand—e.g., as occurs when one drills through the sole plate of a second floor wall into a space within a hollow wall on the first floor.

It is an object of a preferred embodiment of the invention to provide for fishing a flexible line through a guide tube inserted into an access hole cut in a hollow wall and thence through a throughhole in an obstructing structural member. It is also an object of the invention to provide for fishing a flexible line through a throughhole in an obstructing structural member, into a guide tube aligned with that throughhole and thence to an access hole cut into a hollow wall.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 5 is an elevational view of a grasping member employed with the target loop of FIG. 4.

DETAILED DESCRIPTION OF THE INVENTION

Figure 1:
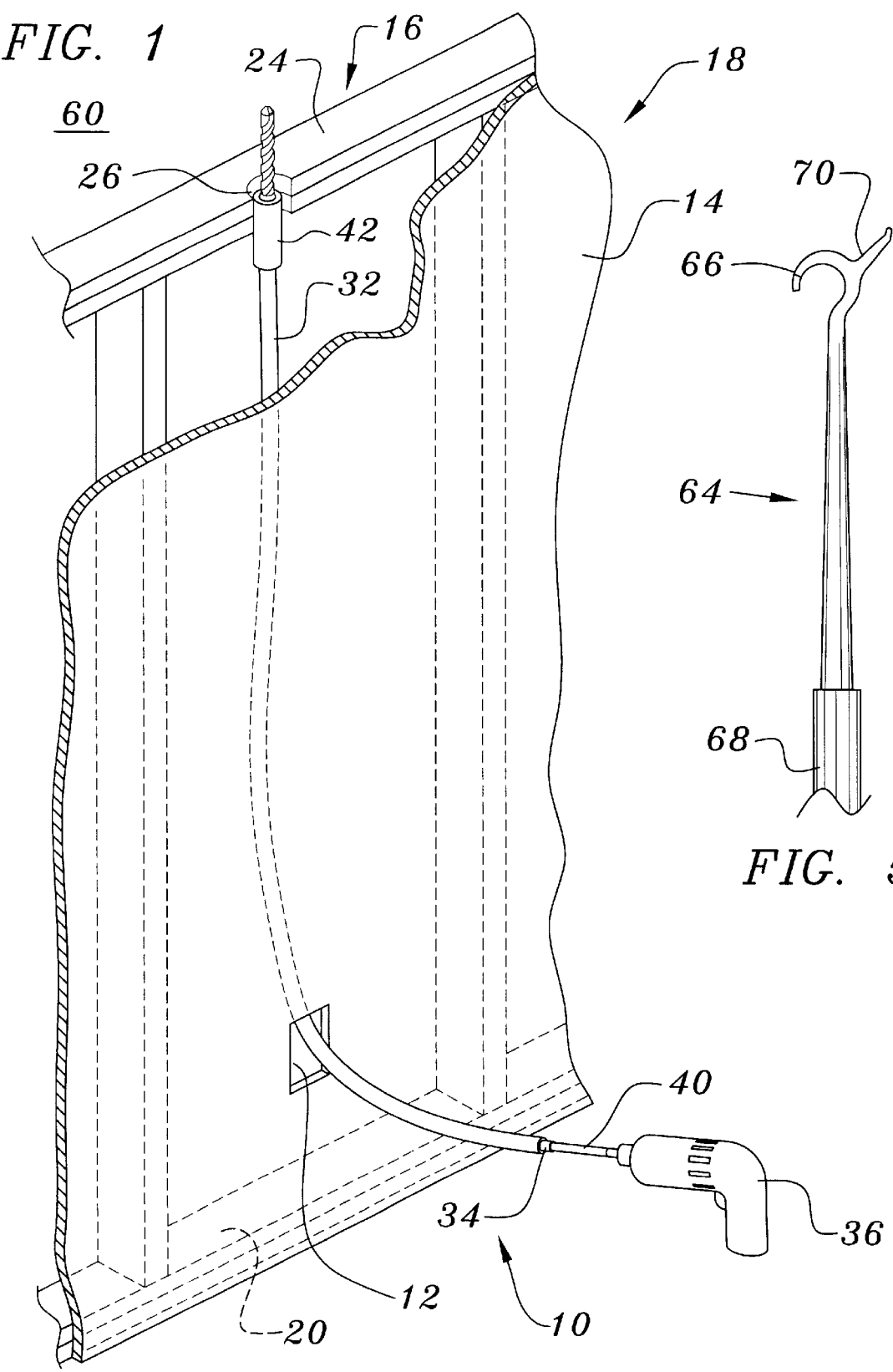
FIG. 1 is a partly cut-away elevational view of an embodiment of the invention being used to drill a throughhole in a top plate of a hollow wall.
Figure 2:
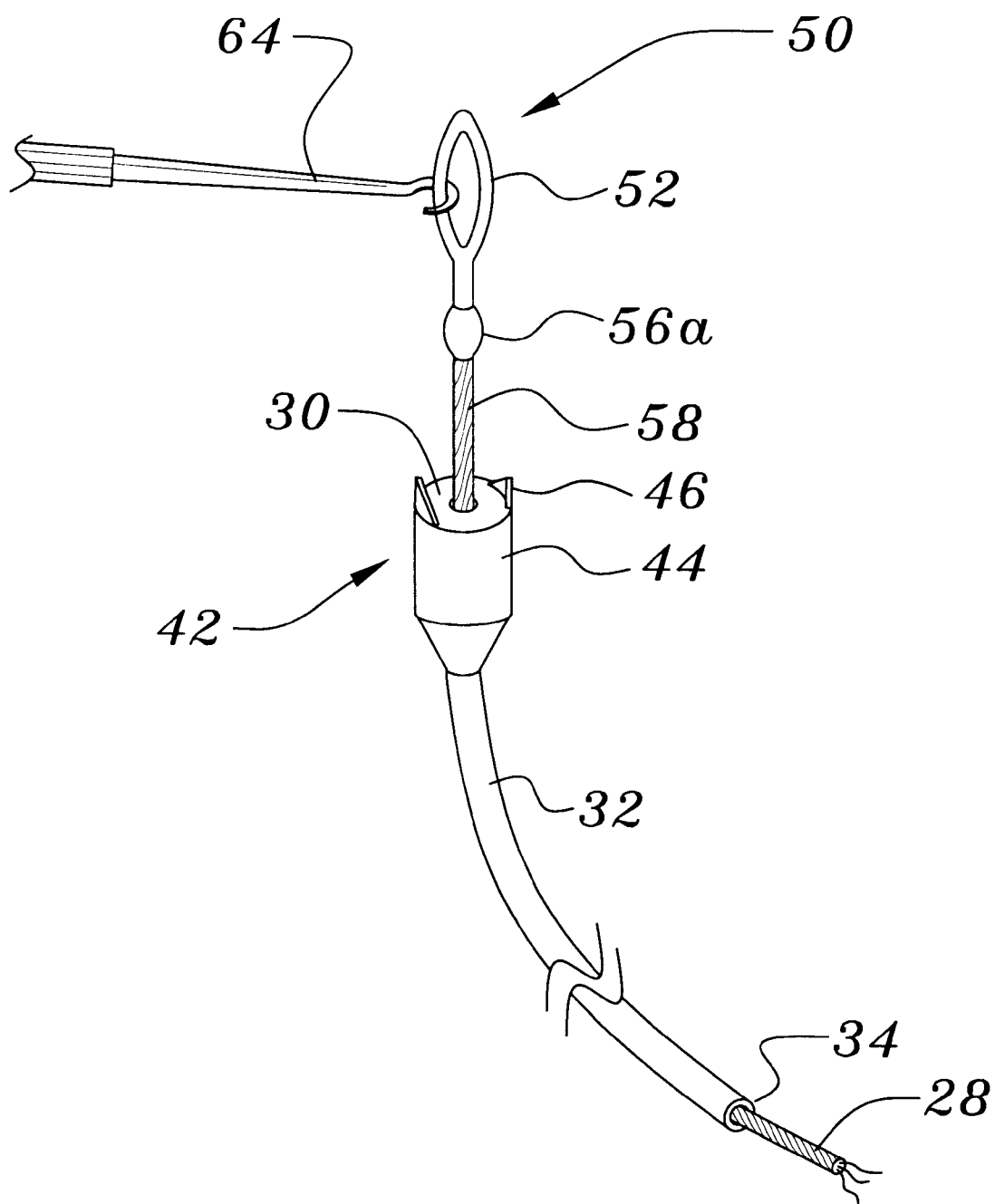
FIG. 2 is an elevational detail view of a work-engaging portion of the apparatus shown in FIG. 1.
Figure 3:
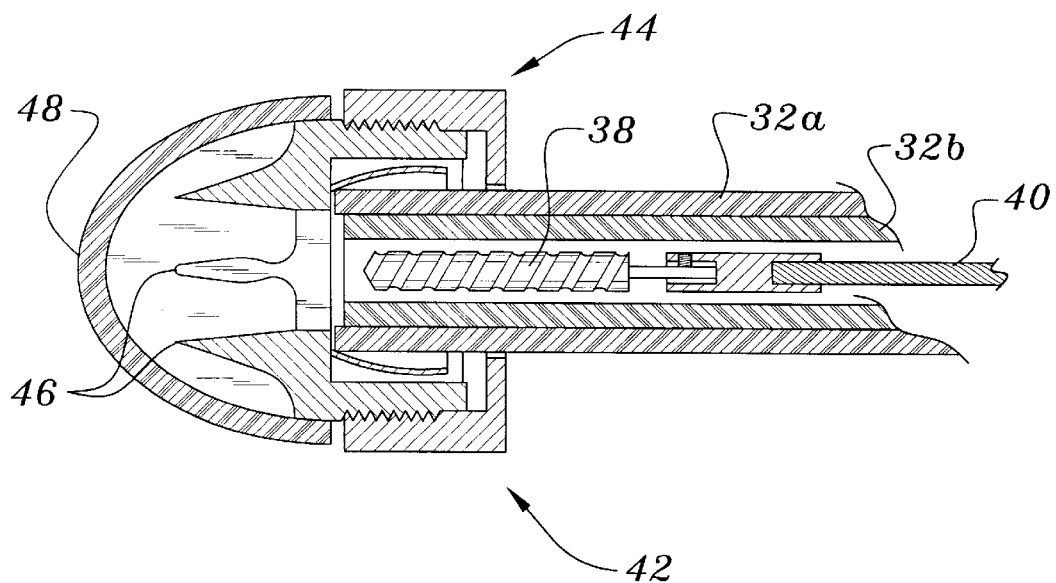
FIG. 3 is a cross-sectional view of the work-engaging end of apparatus of the invention.

Turning initially to FIG. 1, one finds a depiction of a preferred embodiment of a flexible-shafted drilling arrangement 10 of the invention that has been inserted through an access hole 12 in a building panel 14 and is being used to cut through an obstructing member 16 inaccessibly located behind the building panel 14. In most cases of interest, the building panel 14 in question is a plasterboard portion of a conventional hollow wall 18 that comprises a sill 20, a plurality of studs 22 and a top plate 24. It will be clear to persons skilled in the art, and in particular to those who have read the Crocker reference cited above, that the panel may equally well be a portion of a ceiling (not shown) and the obstructing member 16 may be a joist (not shown) instead of the depicted top plate 24. Moreover, it will also be clear that although the following discussion is presented in terms of drilling a throughhole 26 in a top plate 24 and then fishing a line 28 through that hole, the method and apparatus of the invention are equally applicable to cutting holes in sole plates within hollow walls, or for drilling a hole in a ceiling when a worker wishes to avoid climbing up a ladder in order to directly reach the ceiling.

In the following discussion, the location of various parts of the apparatus and structure are generally described with reference to the position of a worker engaged in cutting the throughhole through which a line is to be fished. Thus, the distal end 30 of a guide tube 32 is that end initially inserted into an access hole 12 adjacent which a drilling operation is conducted. The proximal end of the guide tube 34, on the other hand, commonly protrudes out through the access hole 12 and may be adjacent a drill motor 36 used to cut the throughhole 26.

It is known in the art to attach a cutting tool, such as a drill bit 38, to a flexible shaft 40, to insert the cutting tool into a hollow wall, to bring it into working engagement with an obstructing member and to then cut a throughhole in that member. Workers using prior art tools of this sort have generally found that positioning and guiding the drill bit is very difficult. When a drill bit is pushed lightly against a workpiece and then rotated, the drill commonly "walks" away from the intended location of the hole. A preferred embodiment of the invention overcomes this problem by incorporating a work engaging means 42 adjacent the distal end of a flexible guide tube that is initially inserted into an access hole 12. The purpose of the work engaging means 42 is to hold the guide tube 32 in a fixed position while the hole 26 is being drilled and thereby to ensure that the hole is drilled in the desired location.

In the great majority of cases, the obstruction 16 is expected to be wooden structural member (e.g., a piece of softwood lumber) that can effectively be engaged by a work engaging means comprising an annular or tubular metal member or assembly 44 attached to the distal end of the guide tube 32 and having a common axis with the guide tube 32. This sort of work engaging means may comprise a plurality of sharp prongs, tines, or other sharp upstanding members 46 extending generally parallel to the axis of the guide tube 32. One method of temporarily affixing the tube 32 to a wooden structural member is to vigorously push on the proximal portion of the tube extending through the access hole so as to stab the tines 46 into the wood. It will be recognized by those skilled in the art that other sorts of work-engaging means may be called for in some cases. For example, when working in a building in which the obstructing member 16 is made of steel or other ferromagnetic metal, a suitable work-engaging means could comprise a permanent magnet (not shown) annularly disposed about the distal end of the guide tube 32.

Those conversant with the building arts will realize that if the hollow wall through which a line is to be fished is an exterior wall, the cavity of the hollow wall may be filled with insulating material. Trying to push a guide tube having a plurality of prongs at its distal end through intervening fibrous insulation in order to reach a top plate may be a difficult task. To address this problem, a preferred embodiment of the invention comprises a shield cap 48 having a smooth external surface and adapted to cover the prongs 46 and to keep them from becoming entangled with the insulation. In one embodiment the shield cap 48 is a frangible structure made of a thin, brittle plastic material. This cap works well at covering the prongs while the distal end of the guide tube is passing through insulation. Once the working end 30 of the guide tube 32 has been brought into engagement with the obstructing member 16, this cap is easily broken away when the guide tube 32 is stabbed into the workpiece 16. Alternately, a shield cap 48 can be made of a relatively soft material that is strong enough to contain the prongs 46 while being pushed relatively gently through the insulation, but that is pierced by the prongs 46 when the guide tube 32 is stabbed into an obstructing member.

Once the guide tube 32 has been affixed to the obstructing member 16 by the work engaging means 42, a drill bit 38, burrin, auger, or other suitable rotary cutting tool attached to the end of a flexible drive shaft 40 that is longer than the guide tube 32 can be inserted through the proximal end 34 of the guide tube 32, moved through the guide tube and brought into operative contact with the obstruction. As is known in the art, such a tool can be conveniently driven by an electric drill motor 36 to cut a throughhole 26 in the obstruction 16, although other tool rotation means, such as a manual brace or a manual egg-beater drill could conceivably be used for this purpose. Regardless of the choice of rotation means, once the through hole 26 has been formed in the obstructing member 16, the flexible shaft 40 and attached cutting tool 38 are withdrawn from the proximal end 34 of the guide tube 32, leaving the distal end 30 of the guide tube 32 connected to the obstructing member 16 by the work-engaging means 42.

Figure 4:
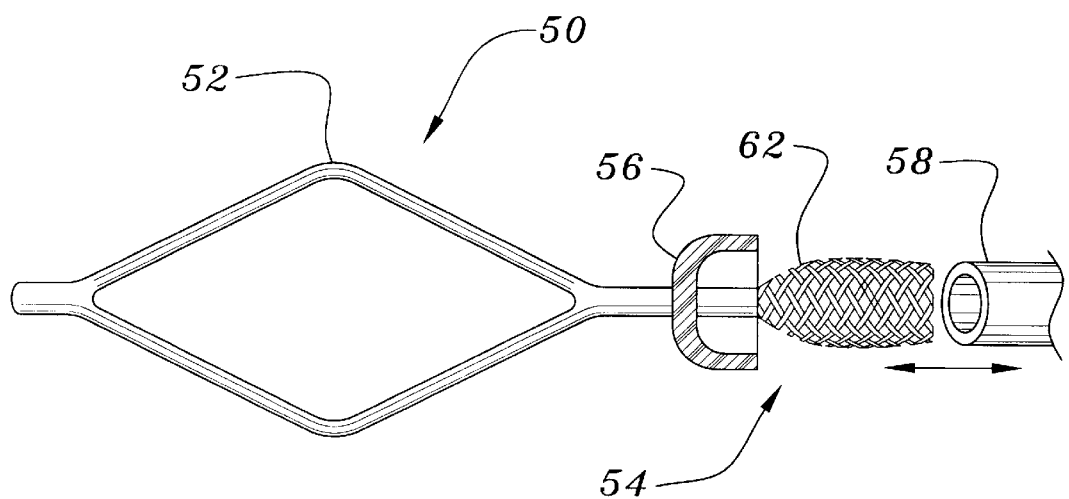
FIG. 4 is an elevational view of line-fishing assembly comprising an expandable target loop.

A line-fishing member or assembly 50 can then be attached to a line 28, introduced into the proximal end 34 of the guide tube 32 and fed through the guide tube 32 and through the throughhole 26 with which it is aligned. In a preferred embodiment, the line fishing member 50 comprises a target loop 52 or other suitable hook-engaging means, a line-engaging means 54, and a connector 56 adapted to attach the fishing member 50 to a flexible feed member 58. In this arrangement, the flexible feed member is a push tube 58 used by a worker adjacent the proximal end 24 of the guide tube 32 to push the line-fishing member 50 through the throughhole into an obstructed space 60. A worker on the distal side of the throughhole 26 can then grasp the target 52 and pull the line 28 through the guide tube 32, through the throughhole 26, and thence into the obstructed space 60. In an embodiment depicted in FIG. 4, the line-engaging means 54 comprises a quick-connection sock 62 made from a loosely woven material that can be pushed into a depicted expanded configuration so that a line 28 may be easily inserted. After inserting the line, the sock 62 can be pulled into a collapsed configuration (not shown) in which frictional forces between the sock 54 and the line 28 serve to connect the line 28 to the line-fishing member 50 so that it can be fitted within the push tube 58. It will be understood to those skilled in the arts that many other sorts of releasable connections may be employed, and that the exact choice of connection means 54 will vary with the nature of the line that is being fished. Moreover, if the line that is to be fed through the throughhole is stiff enough, and if there is adequate working clearance in the obstructed space 60, the line can be fed directly into the guide tube (i.e., without using a line-fishing member), pushed into the obstructed space 60 and captured manually by a worker who does not need to use a hook or other grasping tool.

In an alternate embodiment of the invention, a line-fishing member 50 can be pushed through the guide tube 32 and throughhole 32 without having a line attached to it. In this case the worker on the distal side of the obstruction 16 may capture the line-fishing member and attach a line to it so that the line can be pulled from the obstructed space 60 through the throughhole 26 and guide tube 32 and thence through the access hole 12. It will be clear to those skilled in the art that this arrangement calls for a connector 56a configured to connect the line-fishing member 50 to a flexible feed member 58 (which need not be a tube in this arrangement) during both directions of motion through the guide tube 32.

In either arrangement, a preferred target comprises an expandable loop 52 located adjacent the distal end of the line fishing member 50. This expandable loop 52 is held in a collapsed state by the walls of the guide tube 32 and by the sides of the throughhole 26 as it is fed therethrough. The preferred expandable loop 52 comprises spring-like portions biasing it into an expanded state once the loop portion has passed through the throughhole 26 into the free space 60 on the distal side of the obstructing member 16. In a particular preferred embodiment the expandable loop is brightly colored so as to dramatically contrast with lumber, insulation, electrical wiring and other materials that might be expected to be found in a poorly lit attic. Thus, even if the expanded loop protrudes through a top plate 24 of an exterior wall into a limited free space between that top plate and a shallowly sloping roof, the loop is nonetheless visible to a worker.

It is recognized that even though the preferred expanded loop may be highly visible, it may protrude into a restricted space where the worker can not directly reach it. In such situations, the worker can use an extended grasping means 64, such as a hook 66 on the end of a long pole 68 to seize the expanded loop 52 and pull it to him or her. A preferred embodiment of the grabbing device 64 comprises both a hook portion 66 and a vee-shaped portion 70 that can be used to push the target 52 into a position or orientation where it is easier to grab with the hook 66.

Although the preferred embodiment employs an expandable loop at the distal end of the line-fishing member, it may be noted that many other target arrangements may be used. These other arrangements include, but are not limited to a hook on the end of the line-fishing member adapted to engage a loop on the end of an extended grasping member.

As discussed above, the guide tube must be somewhat flexible in a direction transverse to its axis, so as to allow it to bend along a fairly gentle radius of curvature when it is being threaded into a hollow wall, as depicted in FIG. 1. On the other hand, the guide tube should also be fairly stiff in a direction along its axis so that a worker can vigorously stab a work-engaging member into a piece of lumber. Although many materials may be considered for this use, a preferred embodiment employs a high density polyethylene tube, of the sort sold for water inlet piping in residential construction. In cases in which a single tube is used, a preferred outer diameter is about two inches because a tube of this size is strong to withstand vigorous stabs when implanting the tines 46 of a work engaging means 42 but can also be fairly easily bent to a radius of curvature on the order of one foot, which is generally adequate for working the guide tube into a wall.

The guide tube 32 may comprise a single tubular piece of material, as depicted, in the drawing, or may comprise several pieces of tubing connected end-to-end when the obstruction is too far from the access hole to be reached with a single guide tube 32. Preferably, the connectors used to make a long composite tube from several shorter pieces of tubing are configured so as to provide a smooth internal passage and to avoid gaps that might impede passage of a line or fishing member being fed through the composite tube. It will be recognized by those skilled in the art that there are many sorts of tube connectors available, and that connectors of the type generally referred to as "quick connectors" are advantageous in allowing sections of the composite tube to be added or removed quickly and without the use of tools.

Moreover, some embodiments of the invention allow for the use of multiple guide tubes 32a, 32b having different diameters selected so that a smaller guide tube 32b can be fed through a larger one 32a. In an arrangement of this sort, one could use a guide tube of the largest diameter to drill a large diameter hole through an initial obstruction. A guide tube of the next largest diameter could then be inserted through the first guide tube and through the large diameter, shoved through the free space on the distal side of the first obstructing member until engaging the second obstructing member, through which a smaller diameter hole could be drilled.

An additional feature of some embodiments is the use of a second tube 32b as a bushing around a thin rotating shaft 40 used to drive a fairly large drill bit 38. That is, sometimes one encounters situations in which the drill bit and whatever collet, chuck, or other retainer is used with it are of substantially larger diameter than is the drive shaft. In these cases, the use of a bushing tube makes it easier to feed the drill string into the guide tube and thus aids in preventing the flexible shaft from whipping around inside the guide tube.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. Apparatus for passing a line through an obstruction, the apparatus comprising:
   a guide tube having two ends, the guide tube adapted to flex in a direction transverse to an axis thereof;
   work-engaging means attached to the guide tube adjacent a first of the two ends, the work-engaging means adapted to engage the obstruction;
   a cutting tool driven by a flexible shaft that is longer than the guide tube, the cutting tool adapted to be removably inserted into the second end of the guide tube, to be moved through the guide tube into operative contact with the obstruction, and to cut a throughhole through the obstruction; and
   means for passing a line through both the guide tube and the throughhole.

2. The apparatus of claim 1 wherein the work engaging means comprises a sharp upstanding member extending parallel to the axis of the guide tube.

3. The apparatus of claim 2 further comprising a cap adapted to cover the sharp upstanding member.

4. The apparatus of claim 1 wherein the means for passing the line through the obstruction comprises an expandable loop adapted to have the line attached thereto after the loop has been passed through the throughhole into a space on the distal side of the obstruction.

5. The apparatus of claim 1 wherein the means for passing the line through the obstruction comprises a line-fishing member adapted to be attached to the line prior to feeding the line-fishing member through the guide tube and the throughhole.

6. The apparatus of claim 1 further comprising a second tube having a diameter selected so that the second tube can pass through the throughhole.

7. A method of passing a line through an obstruction disposed within a hollow wall having an access hole formed therein, the method comprising the steps of:
   a) inserting into the access hole a work-engaging means attached adjacent a distal end of a guide tube having two ends, the work engaging means adapted to engage a proximal side of the obstruction;
   b) moving the work-engaging means into engagement with the obstruction by pushing along an axis of the tube;
   c) inserting a cutting tool attached adjacent a distal end of a flexible, rotatable shaft into the proximal, end of the tube;
   d) rotating the cutting tool by tool rotation means attached to a proximal end of the rotatable shaft so as to cut a throughhole through the obstructing member;
   e) withdrawing the cutting tool and flexible shaft from the tube; and
   f) passing the line through the solid obstructing member.

8. The method of claim 7 wherein step f) comprises sub-steps of
   f1) attaching the line to a line-fishing member;
   f2) pushing the line-fishing member through the guide tube and then through the throughhole;
   f3) capturing, on the distal side of the obstruction, the line-fishing member; and
   f4) pulling, from the distal side of the obstruction, the line through the hole.

9. The method of claim 7 wherein step f) comprises sub-steps of:
   f1) attaching a target to a flexible feed member;
   f2) pushing the target through the guide tube and then through the obstruction;
   f3) capturing the target on the distal side of the obstruction;
   f4) attaching the line to the target; and
   f5) pulling, from the proximal side of the obstruction, the line through the obstruction.

10. The method of claim 7 wherein step f) comprises the sub-steps of
    f1) attaching a target comprising an expandable loop to a flexible feed member;
    f2) pushing the target through the guide tube and then through the throughhole; and
    f3) capturing the target on the distal side of the obstruction.

11. The method of claim 7 wherein step f) comprises feeding the line through the guide tube from the proximal end thereof and then feeding the line through the throughhole.

12. The method of claim 7, modified for passing the line through both the first and a second obstruction more distal than the first obstruction, the modified method comprising the additional steps intermediate steps e) and f) of:

e1) inserting a second guide tube having a second work-engaging means at the distal end thereof into the first guide tube and passing the distal end of the second guide tube through the first guide tube, through the throughhole and into working engagement with the second obstruction;

e2) repeating steps c) through e) so as to cut a second throughhole through the second obstruction; and wherein in step f) the line is passed through both obstructions.

* * * * *